United States Patent [19]

Nakao et al.

[11] Patent Number: 5,220,672
[45] Date of Patent: Jun. 15, 1993

[54] LOW POWER CONSUMING DIGITAL CIRCUIT DEVICE

[75] Inventors: Yuichi Nakao; Yoshio Kasai, both of Hyogo, Japan

[73] Assignee: Mitsubishi Denki Kabushiki Kaisha, Tokyo, Japan

[21] Appl. No.: 813,238

[22] Filed: Dec. 23, 1991

[30] Foreign Application Priority Data

Dec. 25, 1990 [JP] Japan .................................. 2-413636
Oct. 3, 1991 [JP] Japan .................................. 3-283552

[51] Int. Cl.⁵ .............................................. G06F 1/32
[52] U.S. Cl. .................................. 395/750; 395/550; 364/707; 365/227
[58] Field of Search ............... 364/DIG. 1, DIG. 2, 364/707; 365/227; 395/550, 750

[56] References Cited

U.S. PATENT DOCUMENTS

| 4,316,247 | 2/1982 | Iwamoto ........................ 364/707 X |
| 4,570,219 | 2/1986 | Shibukawa et al. ............ 395/775 |
| 4,615,005 | 9/1986 | Maejima et al. ............... 364/707 X |
| 4,748,559 | 5/1988 | Smith et al. .................... 364/200 |
| 4,758,945 | 7/1988 | Remedi ........................... 364/200 |
| 4,851,987 | 7/1989 | Day ................................ 364/707 X |

Primary Examiner—Robert L. Richardson
Attorney, Agent, or Firm—Townsend and Townsend

[57] ABSTRACT

A method is provided for decreasing the power consumption of a sequential digital circuit having a plurality of states being determined from the current state and the input conditions and entered upon the assertion of a pulse from one or more clocks. The method consists of interrupting the switching created by the clock pulses and maintaining the system in a quiescent state. It is first determined whether a subsequent clock pulse will lead to a change in the state of the circuit. If it will, the circuit either waits for a change in the input conditions and state of the circuit, or changes some of the input conditions, depending on the embodiment of the invention. When a circuit configuration is reached in which further clock pulses will not lead to a change in the state of the circuit, the clock signal(s) are replaced by continuously asserted signals. The feedback loop thus created maintains the current state of the circuit in the absence of a clock signal and prevents further switching in the circuit.

10 Claims, 8 Drawing Sheets

LOW POWER CONSUMING DIGITAL CIRCUIT DEVICE

BACKGROUND OF THE INVENTION

The present invention relates to power consumption in digital circuitry such as microprocessors, counters and the like. It relates to a method of decreasing the power consumption of a digital circuit which is controlled by clock signals by using a transfer gate composed of metal oxide semiconductor transistors and by stopping the clock.

In complementary metal oxide semiconductor (CMOS) circuits, transistors are typically arranged in complementary pairs. Because only one of these complementary pairs of transistors is usually conducting at a time, the pair as a whole presents a large resistance to the power source and such circuits consume small amounts of power during most of the time they are operating. In CMOS circuits, most of the power is consumed during switching operations when each of the complementary pair of transistors might be conducting at the same time. Consequently the power consumption of a CMOS circuit can be decreased by stopping the clock signal and hence interrupting the switching.

Figure 1:
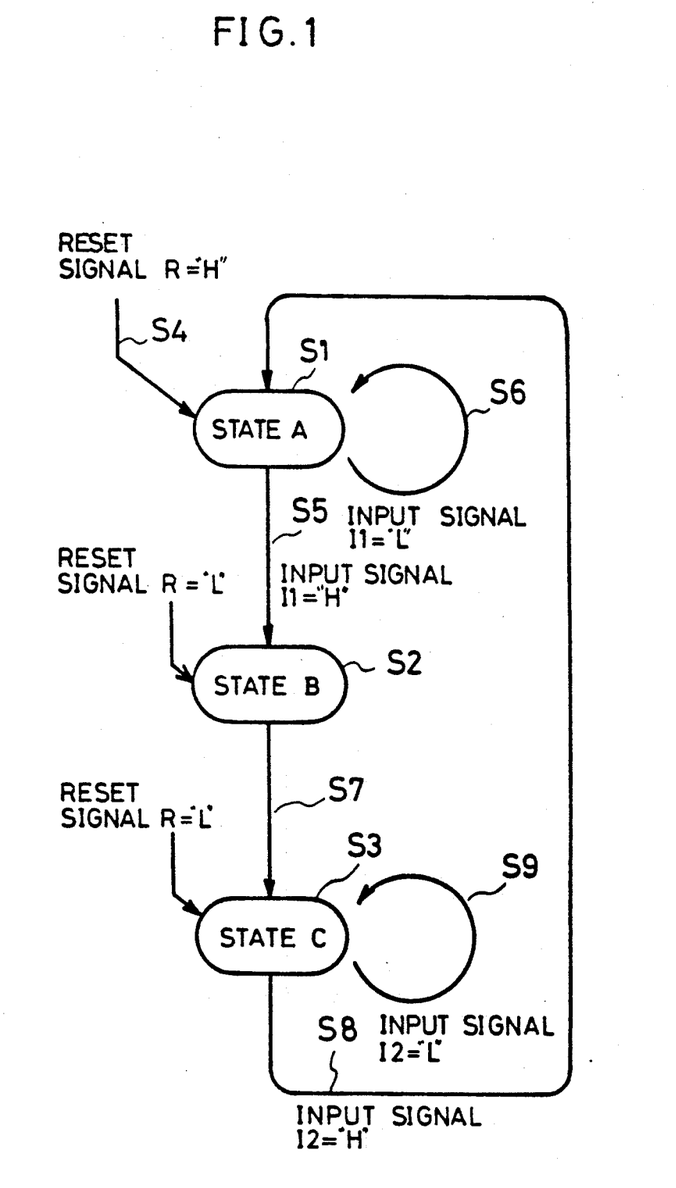
FIG. 1 is a state transition diagram showing a three state digital,,. circuit according to the current invention and the prior art.

The following is a description of a conventional CMOS circuit, as found in the prior art, capable of decreasing the current consumption by stopping the clock. FIG. 1 is a state transition diagram showing the operation of a digital circuit. In FIG. 1, 1, S2 and S3 represent three states of the circuit. S1 corresponds to state A, S2 to state B, and S3 to state C. S4–S9 represent transitions of the circuit from one state to another.

Figure 6:
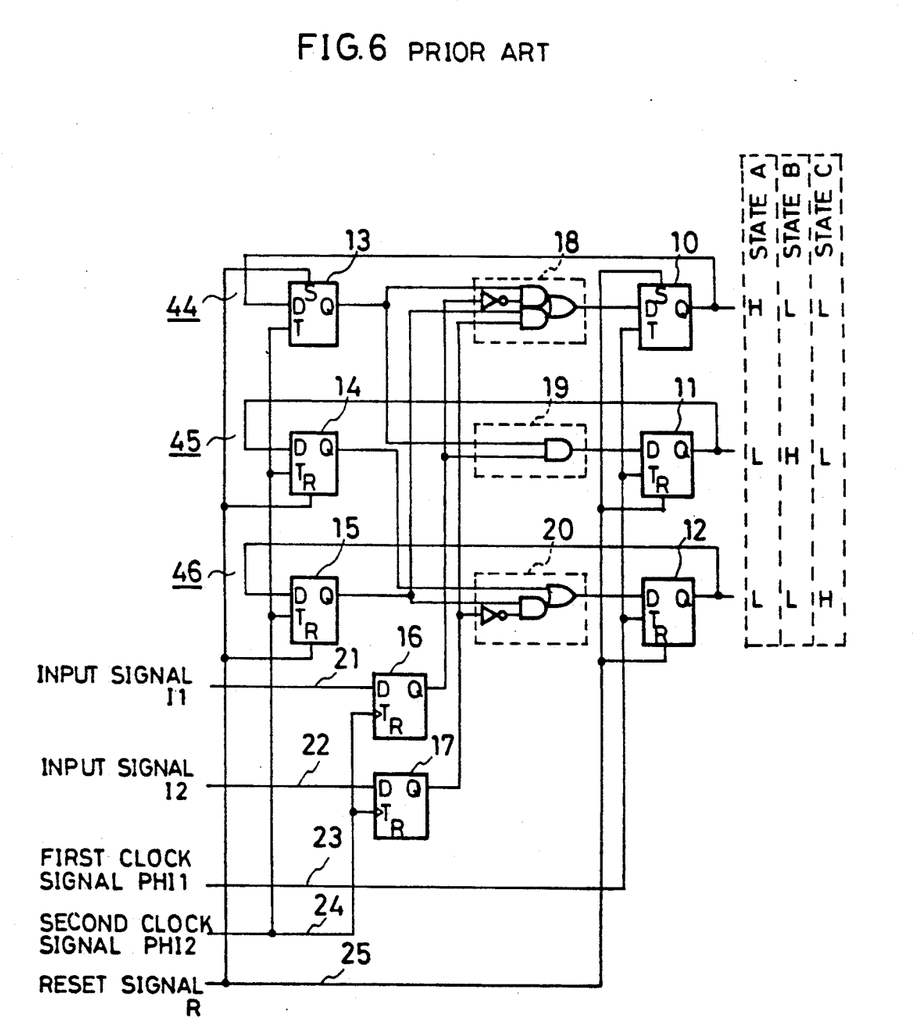
FIG. 6 is a circuit diagram as known in the prior art.

FIG. 6 is a circuit diagram of a particular three-state circuit whose transition diagram might be represented by FIG. 1. FIG. 6 is a CMOS circuit using a two-phase clock according to the prior art. In FIG. 6, numerals 10–15 are D latches, 16 and 17 are master slave flip-flops, 18–20 are logic circuits, 21 and 22 are input signal lines for supplying the input signals $I_1$ and $I_2$, 23 and 24 are clock signal lines for supplying the first clock signal $phi_1$ and the second clock signal $phi_2$, and 25 is a reset signal line for supplying a reset signal.

Figure 7:
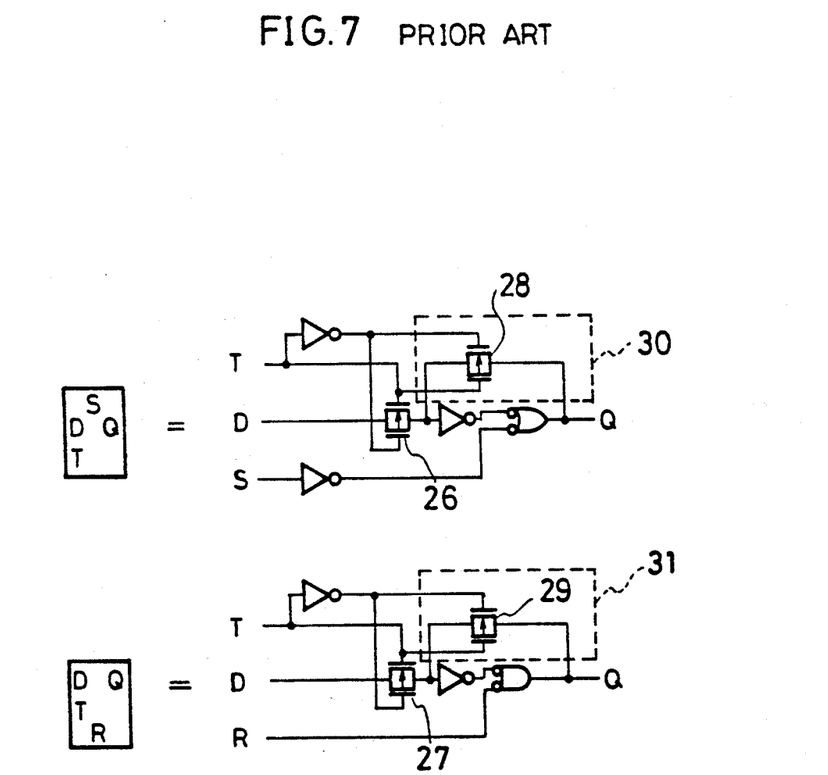
FIG. 7 is a detailed circuit diagram showing the D latch and flip flop components of FIG. 6.

Each D latch and flip-flop in FIG. 6 is composed of CMOS transfer gates 26 and 27 in combination with signal value holding circuits 30 and 31 which use transfer gates 28 and 29 as shown in FIG. 7. The digital circuit shown in FIG. 6 includes subcircuits 44–46, which themselves include logic circuits 18–20 responsive to input signals $I_1$ and $I_2$. A set of transfer gates shown as D latches 10–12 are provided at the output of the logic circuits 18–20. The transfer gates 10–12 open during the pulses of the clock signal $phi_1$. A second set of transfer gates, D latches 13–15, are installed at the input of the logic circuits, and the output of the first set of transfer gates is fed back to the input of the second set of transfer gates through feed back loops. The second set of transfer gates is operated by a second clock signal $phi_2$.

The states of the circuit is defined by the output values of the first transfer gates. The state to which the circuit moves at the next assertion of the clock pulses is determined by the configuration of the circuit, which comprise the state of the circuit and the values asserted at the inputs. The set of all possible configurations may be classified into two categories. One of the categories are the stoppable configurations, in which the input signals $I_1$ and $I_2$ are such that succeeding clock pulses will not lead to a change of state. The other categories are the temporary configurations, in which succeeding clock pulses do lead to a change of state of the circuit.

As shown by the transition diagram in FIG. 1, the circuit has three states: state A (S1); state B (S2); and state C (S3). The circuit responds to a reset signal R, input signal $I_1$ and a second input signal $I_2$. The changes of state are shown by the transition diagram as follows:

1. If the reset signal R is high, the circuit enters state A (S4);
2. If the input signal I is high when the circuit is in state A and the reset signal R is low, the circuit enters state B upon the arrival of the next clock pulse $phi_1$. If $I_1$ is low, the circuit remains in state A (S6);
3. When the circuit is in state B, and the reset signal R is low, the circuit enters state C upon the arrival of the next clock pulse $phi_1$ (S7); and
4. If the input signal $I_2$ is high when the circuit is in state C and the reset signal R is low, the circuit enters state A with the arrival of the next clock pulse phi (S8). If input signal $I_2$ is low, the circuit remains in state C (S9).

For the circuit shown in FIG. 6, the three states are defined by the outputs of the D latches. State A is defined as when D latch 10 is high, state B is defined as when D latch 11 is high and state C is defined as when D latch 12 is high. D latches 10–12 open during the pulses of the first clock signal $phi_1$, and the D latches 13–15 fetch the values of D latches 10–12 during the pulses of the second clock signal $phi_2$. The input signals $I_1$ and $I_2$ are sampled at the flip-flops 16 and 17 during the pulses of the second clock signal $phi_2$.

The operation of the circuit in FIG. 6 follows the transition diagram of FIG. 1 as follows:

1. When the reset signal R is asserted, the D latches 11, 12, 14, and 15 and the flip-flops 16 and 17 are reset, their outputs go to low. The reset signal also sets the D latches 10 and 13, their outputs go to high. Consequently, the circuit enters state A.
2. If the input signal $I_1$ is asserted while the circuit is in state A and the reset signal R is low, the output of the logic circuit 19 goes high and the outputs of logic circuits 18 and 20 go low. At the next pulse of the clock $phi_1$, D latch 10 goes low and D latch 11 goes high. Consequently the circuit enters state B. If, on the other hand, the input signal $I_1$ is low, the output of logic circuit 18 goes high, and that of the logic circuits 19 and 20 go low. Therefore, at the arrival of the next clock pulse, D latch 10 remains high and D latches 11 and 12 remain low. In other words, the circuit remains in state A.

The analysis for the cases where the circuit is in state B or C is similar.

For the prior art circuit in FIG. 6, the state of the circuit immediately before the clock stops is maintained because the D latches 10–15 and the flip-flops 16 and 17 maintain their values even in the absence of clock signals $phi_1$ and $phi_2$. Therefore, unless the circuit must respond to the input, it is possible to decrease the current consumption of the circuit by stopping the clock signal and entering a waiting state. When the clock is stopped the current consumed by the circuit is only the leakage current through insulating films or layers with very high resistance. Therefore, the current consumption is much less than that during the operation of the clock.

Figure 8:
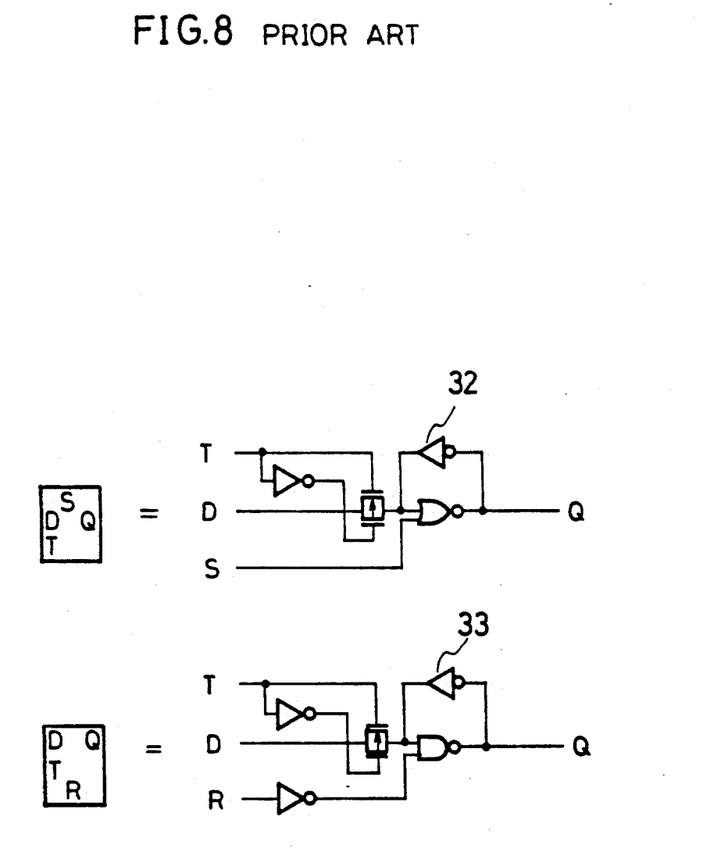
FIG. 8 is a detailed circuit showing another embodiment of the D latch and flip flops according to the prior art.

Because of the configuration of the prior art circuit, the signal value holding circuits 30 and 31 are necessary when the power consumption is to be decreased by stopping the clock. If the signal value holding circuits 30 and 31 were not installed, the output terminals of the transfer gates 26 and 27 would eventually enter a floating state due to leakage of current through the insulating films and PN junctions or crosstalk with other signal lines. In such circumstances, the circuit may malfunction or DC current may flow through the MOS gate at the stage preceding the transfer gate. Several kinds of signal value holding circuits are known in the prior art as shown in FIGS. 7 or 8. The use of any of these signal value holding circuits adversely affects the size, price and reliability of the digital circuit.

SUMMARY OF THE INVENTION

It is an object of the current invention to solve the above problem by decreasing the complexity and number of circuits that need to be added to a digital circuit in order to permit a decrease in the power consumption by stopping the clock. To achieve the above object, the digital circuit of the present invention includes a set of logic circuits controlled by input signals, a first set of transfer gates coupled to the outputs of the logic circuits and transferring data during the pulses of a first clock signal, and a second set of transfer gates whose outputs are coupled to the inputs of the logic circuits and which transfer data during the pulses of a second clock signal. The output values of the first transfer gates are provided, via feedback loops, to the inputs of the second transfer gates.

The configurations of machine states and input conditions of the digital circuit are classified into two categories. One of the categories are the "stoppable" configurations in which subsequent clock pulses will not change the outputs of the first transfer gates as long as the input values $I_1$ and $I_2$ remain unchanged. The other category are the "temporary" configurations, in which subsequent clock pulses will change the state of the circuit.

A clock stopping mode setting circuit is provided which distinguishes the stoppable configurations from the temporary configurations and provides a clock stopping mode signal in response to the former. A clock control circuit is provided which responds to the clock stopping mode signal by interrupting the provision of the first and second clock signals to the transfer gates and supplying a signal to the first and second transfer gates which maintains the gates in an open position.

The above and other objects, features, and advantages of the invention will become more apparent from the following description when taken in conjunction with the accompanying drawings.

In one embodiment of the current invention, the digital circuit has a clock stopping mode setting circuit 70 for discriminating between the stoppable configurations and the temporary configurations and providing a clock stopping mode setting signal KS in response to the former. A clock control circuit responds to the clock stopping mode setting signal by controlling the first and second clock signals $phi_1$ and $phi_2$ so that they are not supplied to the first transfer gates 50-52 nor the second transfer gates 53-55. The clock control circuit further provides a signal holding open the first transfer gates 50-52 and the second transfer gates 53-55. Alternatively, the digital circuit has an input control function which determines the state of the circuit and then sets the input signals $I_1$ and $I_2$ to values selected so that subsequent clock pulses will not change the state of the circuit. In another embodiment of the current invention the clock stopping mode setting circuit 70 determines when the circuit is in a stoppable configuration based on the output signals of the subcircuits 44-46 and the first and second clock signals $phi_1$ and $phi_2$.

Another feature of the current invention is its responsiveness to a release signal K provided to the circuit which releases the stop state. This is accomplished by providing reset circuits 60-65, consisting of logic gates, to be opened or closed in response to a reset signal R provided to the circuit. These reset gates are coupled to the output terminals of the first transfer gates 50-52 and the second transfer gates 53-55.

DESCRIPTION OF THE PREFERRED EMBODIMENT

Figure 2:
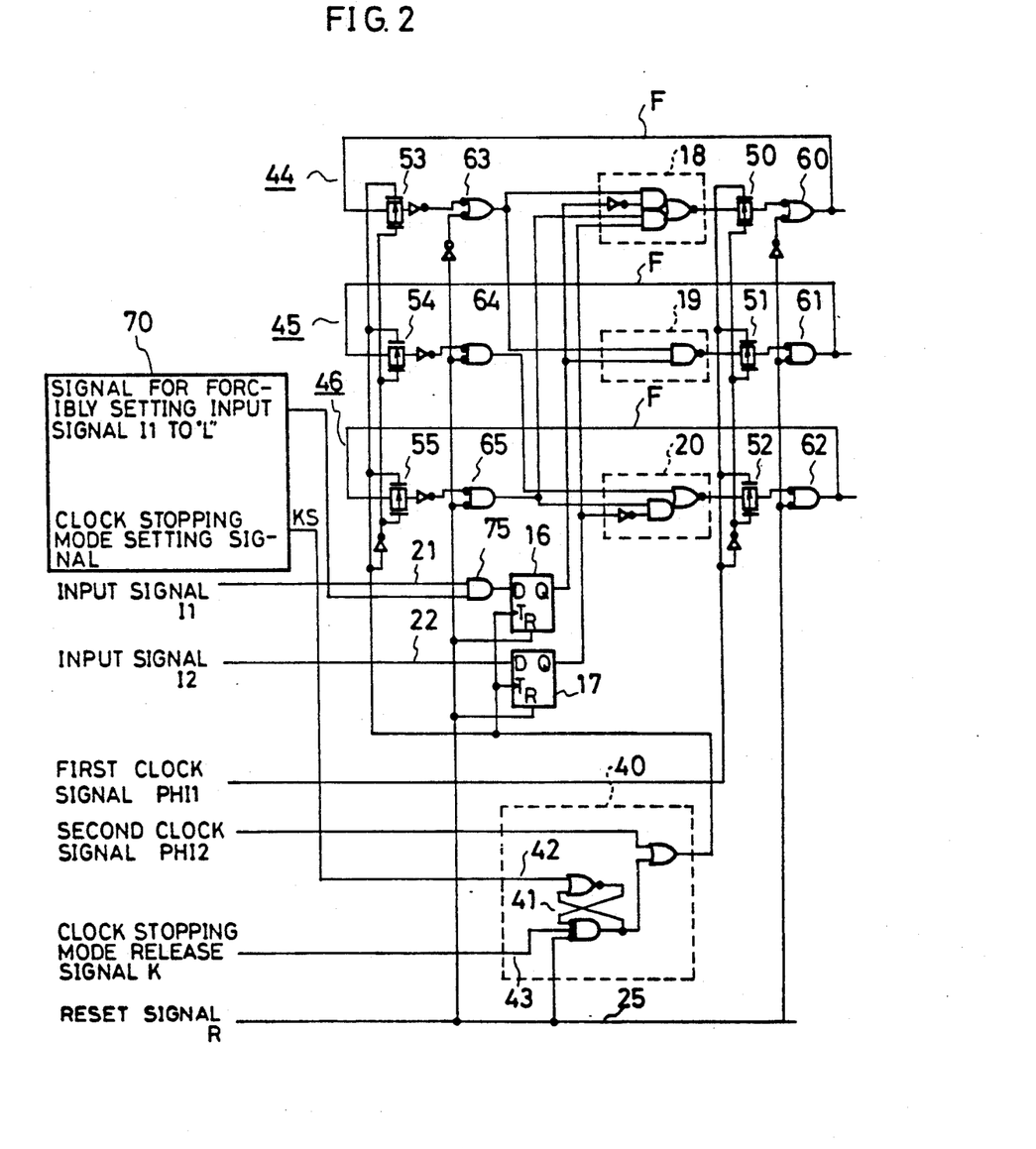
FIG. 2 is a circuit diagram of a digital circuit according to the/present invention.

FIG. 2 shows an embodiment of the digital circuit according to the present invention. The digital circuit of FIG. 2 includes subcircuits 44-46 which contain logic circuits 18-20, first transfer gates 50-52, coupled to the outputs of the logic circuits and second transfer gates 53-55 whose outputs are coupled to the inputs of logic circuits 18-20. The first transfer gates 50-52 open during the pulses of clock $phi_1$. The second transfer gates 53-55 open during the pulses of clock $phi_2$. The output of the first transfer gates 50-52 is provided to the inputs of the second transfer gates 53-55 via feedback loops.

In this embodiment the configurations of the circuit, which consist of the input conditions and the states of the subcircuits 44-46, as defined by the output values of the first transfer gates 50-52, are classified into two categories. One of the two categories are the "stoppable" configurations in which the input signals are such that a pulse in the first clock signal $phi_1$ does not change the output of the first transfer gates 50-52. The other category consists of the "temporary" configurations, in which a pulse in clock signal phi changes the output values of the first transfer gates 50-52.

The digital circuit in FIG. 2 has the following features:

1. The sub-circuits 44-46 consist of first transfer gates 50-52 and the second transfer gates 53-55. The first transfer gates 50-52 of the sub-circuits 44-46 do not include a signal value holding circuit but have parasitic capacity as will be described later. A reset circuit is provided which consists of reverse OR gates 60-65 coupled to the outputs of the first transfer gates 50-52 and the second transfer gates 53-55. Reverse OR gates 60-65 are responsive to reset signal R.

Figure 3:
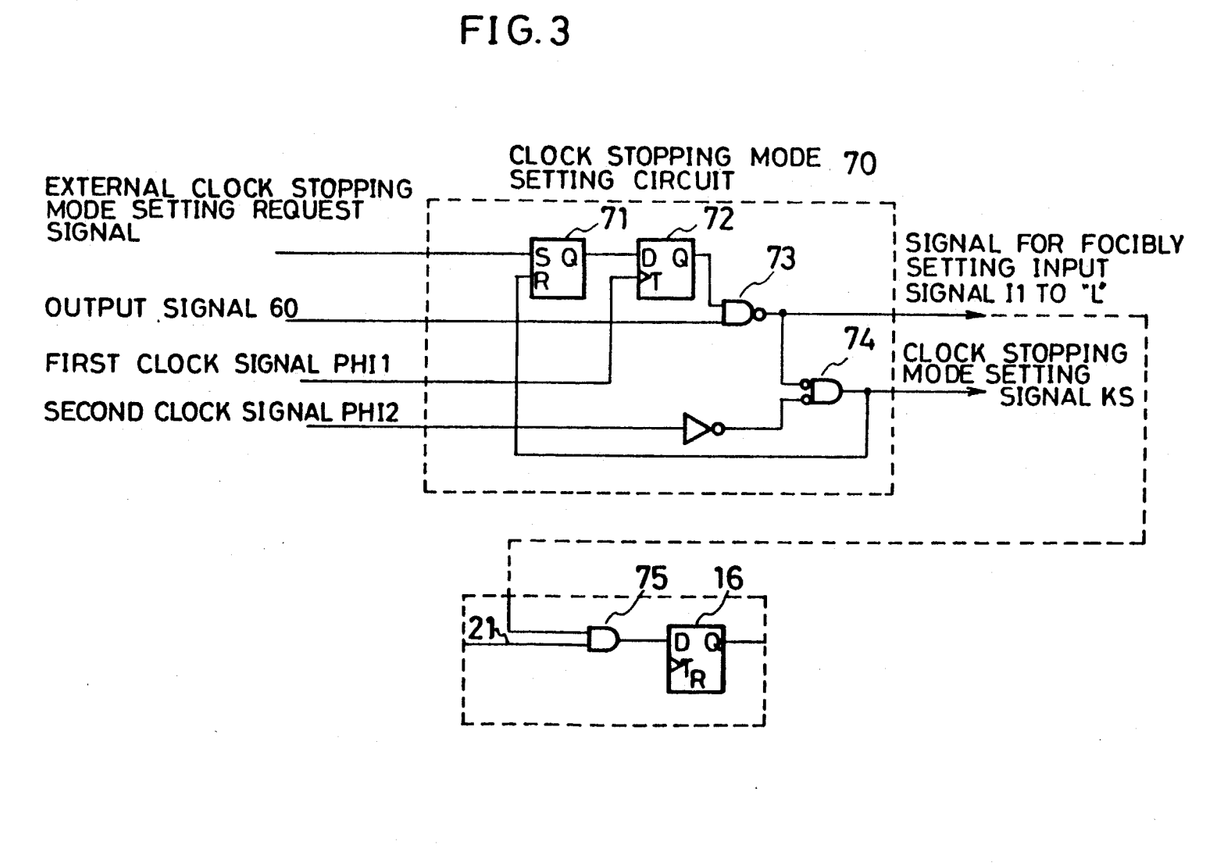
FIG. 3 is a circuit diagram showing an embodiment of the clock stopping, mode setting circuit according to the present invention.

2. A clock stopping mode setting circuit 70 is provided for determining the stoppable configurations and providing a clock stopping mode setting signal KS in response thereto. A clock control circuit 40 responds to the clock stopping mode setting signal KS by controlling the first and second clock signals phi$_1$ and phi$_2$ so that they are not supplied to the first and second transfer gates 50-55, and providing a signal to the first and second transfer gates 50-55 holding the gates open. FIG. 3 shows one embodiment of the clock stopping mode setting circuit 70. An SR latch 71 receives an externally generated clock stopping mode setting request signal. D latch 72 received the output of SR latch 71 and the first clock signal phi$_1$. The output signal 60 from the first transfer gate 50 and the output of the D latch 72 are provided to a NAND gate 73. The output of the NAND gate 73 is returned to the circuit in order to forcibly set the input signal I$_1$ to low. The output of the NAND gate 73 is also provided to a reverse AND gate 74 as is the inverted second clock signal phi$_2$. The output of reverse AND gate 74 is fed back to the reset input of SR latch 71 and also returned to the circuit as the clock stopping mode setting signal KS. As will be apparent from the diagram, the clock stopping mode setting circuit responds to an external clock stopping request by setting the input value I$_1$ to low and thus insuring that the circuit enters a stoppable configuration. In FIG. 2, the clock control circuit 40 consists of the SR latch 41 clock stopping mode setting signal line 42, clock stopping mode release signal line 43, and reset signal line 25.

The operation of the circuit is as follows:

In its normal operating state, such as after having received a reset signal R, the SR latch 41 is low and the clock signal control circuit 40 does not interrupt the clock. Under these conditions the first clock signal phi$_1$ and the second clock signal phi$_2$ are provided to the transfer gates 50-55 and the circuit functions as does the prior art circuit shown in FIG. 6. Because no signal value holding circuits are installed at the output terminals of the transfer gates 50-55, these output terminals begin to float when the corresponding clock signal is low. Under normal operating conditions, the repeated pulses in the clock circuits phi$_1$ and phi$_2$ are sufficiently close together to prevent these terminals from drifting away from their last asserted values. Therefore, when the clock signals are operating, no signal value holding circuitry is necessary.

When the circuit power consumption is to be minimized by stopping the clock pulses, however, provision must be made to prevent the transfer gate outputs from drifting away from their last asserted values.

The first step of the procedure is to set the circuit in a configuration suitable to stop the clock. That is the circuit should be set in a configuration in which the combination of input conditions and the present circuit state will lead to repetitions of the present state when the clock signal is asserted. In the preferred embodiment the circuit in FIG. 2 operates according to the state transition diagram in FIG. 1. Therefore the circuit is in a stable or stoppable configuration when it is in state A and the input signal I$_1$ is low, or when it is in state C and the input signal I$_2$ is low. Consider for example the situation when the circuit is in state A and the input signal I$_1$ is low.

As described above the clock stopping mode setting circuit 70 determines a stoppable configuration by reading the output signals of the subcircuits 44-46 and the first and second clock signals phi$_1$ and phi$_2$. The circuit then supplies the clock stopping mode setting signal KS to the clock control circuit 40.

Figure 4:
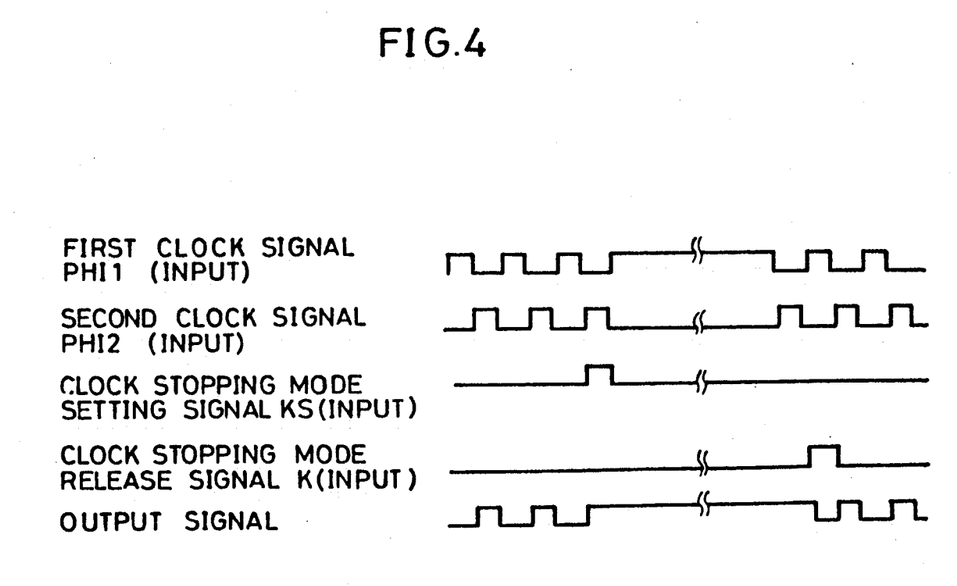
FIG. 4 is a timing diagram showing the operation of the clock control circuit according to the present invention.

The next step of the procedure is to control the clock so that the first clock signal phi$_1$ and the second clock signal phi$_2$ are simultaneously asserted before stopping the clock. The clock control circuit 40 in FIG. 2 is used for the above purpose and its operation is shown in FIG. 4. When the clock stopping mode setting signal KS is asserted the SR latch 41 is set and the first and second clock signals phi$_1$ and phi$_2$ are continuously supplied to the circuit. This mode is released by externally asserting the clock stopping mode release signal K.

The clock control circuit 40 in FIG. 2 stops the first and second clock signals phi$_1$ and phi$_2$ upon the assertion of the clock stopping mode setting signal KS and remains in this configuration until the external release signal K is asserted.

Figure 5A:
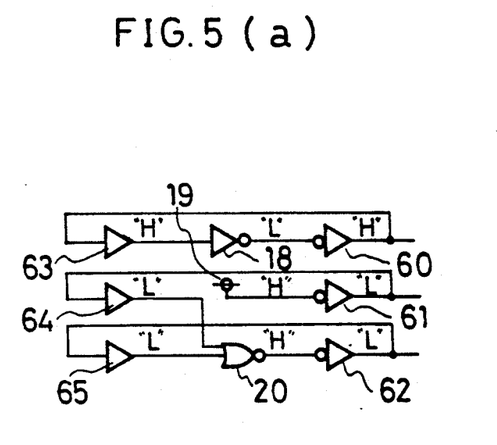
FIGS. 5(a) and 5(b) are diagrams of circuits logically equivalent to the circuit of FIG. 2 in states A and B.

FIG. 5A shows a logically equivalent circuit to the circuit in FIG. 2 when it is in state A, the input signal I$_1$ is low and the first clock signal phi$_1$ and the second clock signal phi$_2$ are simultaneously high. The circuit in FIG. 5A consists of two positive feedback loops. These feedback loops maintain the stability of the circuit and insure that the output of the transfer gates do not drift from their previously asserted values.

Figure 5B:
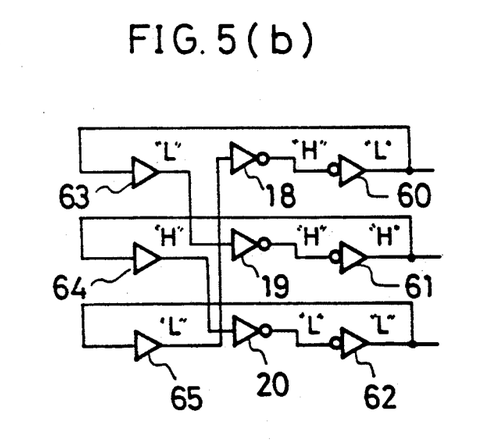

The necessity of bringing the circuit to a stoppable configuration before stopping the clock can be seen from FIG. 5B. FIG. 5B shows a circuit which is logically equivalent to the circuit in FIG. 2 when both clock signals phi$_1$ and phi$_2$ are high, the circuit is in state B, and both of the input signals I$_1$ and I$_2$ are high. FIG. 5B contains one feedback loop, but the logical values are inconsistent with each other as they are traced about the loop. Consequently, the feedback causes each gate to switch in succession, and this switching propagates around the loop repeatedly. Consequently, it is impossible to maintain the state of the outputs of the transfer gates 50-55 that existed immediately before the clock signals were simultaneously asserted.

The current invention decreases the number of circuit elements required because it does not require any signal value holding means for the output terminal of the transfer gates. These transfer gates can be quite simple, such as MOS transistors.

Although a simple circuit is used as the preferred embodiment, the present invention can be applied to a more complex circuit. The present invention is more effective in a complex circuit because the number of signal value holding circuits that would ordinarily have to be used increases with the complexity of the circuit, whereas the clock stopping mode setting circuit and clock control circuit do not. For a more complex circuit, it is only required that the circuit be in a stoppable configuration. That is, a combination of input conditions and current circuit state in which subsequent clock pulses do not change the state of the circuit.

Even if a configuration meeting the above condition is not present in a state transition diagram for a particular circuit, it is possible to produce a combination of a state and input conditions meeting the above conditions by adding input signals and states. Consequently, the present invention can be applied to various circuits operated by multi-phase clocks.

The clock signal control circuit is not restricted to the preferred embodiment. Any circuit capable of stopping a plurality of clocks with each of them asserted can be used for the clock signal control circuit.

In the preferred embodiment a multi-phase clock is provided from outside of the circuit. However, the present invention can also be applied to a circuit which itself generates a multi-phase clock signal from an externally supplied single-phase clock signal.

As described above, the digital circuit according to the invention makes it possible to keep first and second sets of transfer gates, controlled by first and second clock signals, open while stopping the clock signal. This is the case because the first and second clock signals can simultaneously be active when the combination of the internal state and the input signals does not cause the circuit to change to the next state. Under these conditions, when stopping the clock signal, the first and second sets of transfer gates can be kept open. Thus, it is unnecessary to add any signal value holding means for holding the values asserted at the outputs of the transfer gates in preparation for stopping the clock. The present invention thus provides advantageous gains in cost, complexity and reliability of the circuit.

The clock stopping mode setting circuit may operate either by determining whether the combination of present circuit states and values at the inputs constitutes a stoppable configuration, or it may change the values at one or more of the inputs to bring the circuit into a stoppable configuration. In the first instance the circuit only permits stopping the clock when the state of the circuit and its input conditions are such that the circuit will remain stable when all of the transfer gates are conducting. In the second case, the clock stopping mode setting circuit changes the values of some of the inputs so that a stable condition results when all of the transfer gates are conducting. As is apparent, the clock stopping mode setting circuit can also be configured to change some of the selected inputs in order to bring the circuit into a stoppable configuration while respecting the values of the other inputs. Accordingly, great flexibility can be realized in determining when the circuit is to be forced into a stoppable configuration by changing the values appearing at a selected number of its inputs.

What is claimed is:

1. A digital logic circuit comprising:
    a plurality of digital sub-circuits, each having an input and an output;
    a first plurality of transfer gates, one for each sub-circuit, having inputs coupled to the outputs of the sub-circuits, said transfer gates being activated by a first clock signal;
    a second plurality of transfer gates, one for each sub-circuit, having inputs coupled to the outputs of said first transfer gates and outputs coupled to the inputs of the sub-circuits, said transfer gates being activated by a second clock signal;
    means for detecting a stoppable state where the state of the circuit will not change with the application of a pulse in any clock signal;
    means for discontinuing said first and second clock signal when a stoppable state is detected; and
    means for simultaneously opening said first and second sets of transfer gates to form a continuous feedback signal causing the circuit to remain in said stoppable state when said first and second clock signals are discontinued.

2. The circuit of claim 1, further comprising: means for resetting said circuit to a predetermined state in response to an externally applied reset signal.

3. The circuit of claim 2, wherein the means for resetting said circuit to a predetermined state comprise:
    a plurality of logic gates, one for each transfer gate, each said logic gate having at least a first and second input, said first input being coupled to the output of said transfer gate and said second input adapted to receive said reset signal.

4. The circuit of claim 1 wherein said means for determining further comprises:
    means for responding to said clock signals and an output of said first transfer gates.

5. The circuit of claim 1 wherein said means for discontinuing further comprises:
    means for latching to said first and second clock signals to a predetermined value and for unlatching said clock signals in response to a release signal.

6. A low power consuming digital circuit device comprising logic circuits controlled by input signals; first transfer gates which are provided on the output sides of said logic circuits, have parasitic capacity surrounding said logic circuits, open when a first clock signal is at the first level (H or L), and close when the first clock signal is at the second level (L or H); and second transfer gates which are provided at the input sides of said logic circuits, to which the outputs of said first transfer gates are inputted through a feedback loop, and which are opened by a second clock signal; wherein said circuit device has two states which are set by output values of said first transfer gates; one of the two states is a stoppable state in which it is determined by said input signal whether said output values of said first transfer gates are changed or not by the change of the first clock signal to the first level; and the other is a temporary state for changing said output values of said first transfer gates by the change of the next first clock signal to the first level regardless of the value of the input signal, characterized in that
    the circuit device further comprises a clock stopping mode setting circuit for detecting output values of said first transfer gates for specifying said stoppable mode to output a clock stopping mode signal; and a clock control circuit for outputting a second clock signal for opening said second transfer gates, and responsive to the clock stopping moded signal not to supply the second clock signal to said second transfer gates.

7. A low power consuming digital circuit device according to claim 6, wherein
    said clock stopping mode setting circuit has a control function to set the input signal to such a value as not to change the state of the circuit device at transition of the next first clock signal to the first level when detecting output values of said first transfer gates for specifying the stoppable state.

8. A low power consuming digital circuit device according to claim 6, wherein
    said clock stopping mode setting circuit detects the stoppable state of the circuit device by discriminating the output signal of the circuit device form the first and second clock signals.

9. A low power consuming digital circuit device according to claim 6, wherein
    said clock control circuit stops the second clock signal before releasing this stopped state in response to an external release signal.

10. A low power consuming digital circuit device according to claim 6, wherein
    a reset circuit comprising a gate opened and closed by a reset signal is each provided on the output side of said first and second transfer gates.

* * * * *